(12) United States Patent
Froy et al.

(10) Patent No.: US 12,573,264 B2
(45) Date of Patent: Mar. 10, 2026

(54) ADJUSTING FLOOR LAYOUT BASED ON BIOMETRIC FEEDBACK FOR WAGERING GAMES

(71) Applicant: IGT, Las Vegas, NV (US)

(72) Inventors: David Froy, Lakeville-Westmorland (CA); Stefan Keilwert, St. Josef (AT); Michael Russ, Graz (AT); Soheil Latifi, Moncton (CA)

(73) Assignee: IGT, Las Vegas, NV (US)

( * ) Notice: Subject to any disclaimer, the term of this patent is extended or adjusted under 35 U.S.C. 154(b) by 272 days.

(21) Appl. No.: 18/201,849

(22) Filed: May 25, 2023

(65) Prior Publication Data

US 2024/0395105 A1     Nov. 28, 2024

(51) Int. Cl.
*G07F 17/32*         (2006.01)
*G06V 10/82*         (2022.01)
*G06V 40/16*         (2022.01)

(52) U.S. Cl.
CPC .......... *G07F 17/3239* (2013.01); *G06V 10/82* (2022.01); *G06V 40/172* (2022.01); *G07F 17/323* (2013.01)

(58) Field of Classification Search
CPC . G07F 17/3239; G07F 17/323; G06V 40/172; G06V 10/82
See application file for complete search history.

(56) References Cited

U.S. PATENT DOCUMENTS

| | | | |
|---|---|---|---|
| 6,626,758 B1 * | 9/2003 | Parham | G07F 17/32 |
| | | | 463/25 |
| 8,147,334 B2 | 4/2012 | Gatto et al. | |
| 8,758,102 B2 | 6/2014 | Block et al. | |
| 8,764,566 B2 | 7/2014 | Miltenberger et al. | |
| 2004/0002386 A1 * | 1/2004 | Wolfe | G07F 17/3218 |
| | | | 463/40 |
| 2004/0038733 A1 * | 2/2004 | Walker | G07F 17/3244 |
| | | | 463/25 |
| 2008/0020845 A1 * | 1/2008 | Low | G07F 17/32 |
| | | | 463/42 |
| 2008/0032787 A1 | 2/2008 | Low et al. | |

(Continued)

OTHER PUBLICATIONS

Olufisayo Ekundayo and Serestina Viriri, Deep Forest Approach for Facial Expression Recognition, 2020, Springer Nature Switzerland AG. (Year: 2020).*

*Primary Examiner* — Werner G Garner
(74) *Attorney, Agent, or Firm* — Sheridan Ross P.C.

(57)         ABSTRACT
Managing a gaming venue floor layout can comprise maintaining a biometric information model and a floor layout model. Biometric information can be received from sensors associated with players in a gaming venue, each player using a gaming system of the gaming venue. The plurality of gaming systems can be physically located in the gaming venue according to a predefined floorplan for the gaming venue. An excitement level for each player of the plurality of players can be rated based on the received biometric information and the biometric information model. A heatmap representing the gaming venue can be created based on the rated excitement level for and a location of each player of the plurality of players in the gaming venue. The predefined floorplan for the gaming venue can be updated based on the created heatmap and the floor layout model.

20 Claims, 5 Drawing Sheets

(56)  References Cited

U.S. PATENT DOCUMENTS

| | | | |
|---|---|---|---|
| 2008/0248865 A1* | 10/2008 | Tedesco | G07F 17/32 |
| | | | 463/25 |
| 2008/0263088 A1* | 10/2008 | Webster | G06F 16/29 |
| 2011/0183732 A1 | 7/2011 | Block et al. | |
| 2014/0118554 A1* | 5/2014 | Bucknor | G06V 20/52 |
| | | | 348/155 |
| 2015/0269810 A1* | 9/2015 | Wolf | G07F 17/34 |
| | | | 463/25 |
| 2015/0302482 A1* | 10/2015 | Vagner | G06Q 30/0269 |
| | | | 705/14.66 |
| 2017/0200139 A1* | 7/2017 | Dabrowski | G07F 17/3244 |
| 2020/0405212 A1* | 12/2020 | Chappell, III | A61B 5/0042 |
| 2021/0073516 A1* | 3/2021 | Luo | G06V 10/764 |

* cited by examiner

ADJUSTING FLOOR LAYOUT BASED ON BIOMETRIC FEEDBACK FOR WAGERING GAMES

BACKGROUND

The present disclosure is generally directed to managing a gaming venue, in particular, toward managing electronic games deployed on gaming systems in a gaming venue.

For a floor layout of a casino venue or other gaming venue, a system for controlling the layout may use historical data such as venue occupancy, hold percentage, etc. to help the user decide how to layout the floor plan for where various games are placed. The data is based on financial transactions and not upon the player experience. Without considering the player experience, the games deployed around the gaming venue may not be in locations that maximize their use and player engagement. Hence, there is a need in the art for improved methods and systems for managing a gaming venue floor layout.

BRIEF SUMMARY

Embodiments of the present disclosure are directed to managing electronic games deployed on gaming systems in a gaming venue. According to one embodiment, a method for managing a gaming venue floor layout can comprise maintaining a plurality of trained models. The plurality of trained models can comprise a biometric information model and a floor layout model. Biometric information can be received from each of a plurality of sensors. The biometric information can be associated with each of a plurality of players in a gaming venue, each player of the plurality of players using a gaming system of a plurality of gaming systems of the gaming venue. The plurality of gaming systems can be physically located in the gaming venue according to a predefined floorplan for the gaming venue. An excitement level for each player of the plurality of players can be rated based on the received biometric information and the biometric information model. A heatmap representing the gaming venue can be created based on the rated excitement level for and a location of each player of the plurality of players in the gaming venue. The predefined floorplan for the gaming venue can be updated based on the created heatmap and the floor layout model.

In some cases, updating the predefined floorplan for the gaming venue can comprise downloading an electronic game to a gaming system of the plurality of gaming systems. Additionally, or alternatively, updating the predefined floorplan for the gaming venue can comprise providing information indicating a change to the predefined floorplan. Updating the predefined floorplan for the gaming venue can additionally, or alternatively, comprise providing, to a player of the plurality of players, a suggestion for a new electronic game available on a gaming system of the plurality of gaming systems.

In some cases, the method can further comprise creating an attraction to a gaming system of the plurality of gaming systems based on the updated floorplan for the gaming venue. For example, the attraction can comprise a display on a display device. Additionally, or alternatively, the attraction can comprise an audio stream.

According to another embodiment, a floor manager system can comprise a processor and a memory coupled with and readable by the processor. The memory can store therein a set of instructions which, when executed by the processor, causes the processor to maintain a plurality of trained models. The plurality of trained models can comprise a biometric information model and a floor layout model. The instructions can further cause the processor to receive biometric information from each of a plurality of sensors. The biometric information can be associated with each of a plurality of players in a gaming venue and each player of the plurality of players can be using a gaming system of a plurality of gaming systems of the gaming venue.

For example, the biometric information can be received from a user device of a player of the plurality of players. Additionally, or alternatively, the biometric information can be received from a video camera of the gaming venue. In such cases, the biometric information can comprise, for example, facial recognition information and/or location information. The biometric information can additionally, or alternatively, be received from an InfraRed (IR) camera in the gaming venue. In such cases, the biometric information can comprise a heart rate of a player of the plurality of players and/or a respiration rate of a player of the plurality of players.

The plurality of gaming systems can physically be located in the gaming venue according to a predefined floorplan for the gaming venue. The instructions can further cause the processor to rate an excitement level for each player of the plurality of players based on the received biometric information and the biometric information model, create a heatmap representing the gaming venue based on the rated excitement level for and a location of each player of the plurality of players in the gaming venue, and update the predefined floorplan for the gaming venue based on the created heatmap and the floor layout model.

According to yet another embodiment, a non-transitory, computer-readable medium can comprise a set of instructions stored therein which, when executed by a processor, causes the processor to maintain a plurality of trained models. The plurality of trained models can comprise a biometric information model and a floor layout model. The instructions can further cause the processor to receive biometric information from each of a plurality of sensors, the biometric information associated with each of a plurality of players in a gaming venue, each player of the plurality of players using a gaming system of a plurality of gaming systems of the gaming venue. The plurality of gaming systems can be physically located in the gaming venue according to a predefined floorplan for the gaming venue. The instructions can further cause the processor to rate an excitement level for each player of the plurality of players based on the received biometric information and the biometric information model, create a heatmap representing the gaming venue based on the rated excitement level for and a location of each player of the plurality of players in the gaming venue, and update the predefined floorplan for the gaming venue based on the created heatmap and the floor layout model.

The instructions can further cause the processor to train the biometric information model based on the received biometric information. For example, the instructions can cause the processor to train the biometric information model using deep forest training process. Additionally, or alternatively, the instructions can further cause the processor to train a facial recognition classifier using a convolutional neural network or a deep learning process.

Additional features and advantages are described herein and will be apparent from the following Description and the figures.

BRIEF DESCRIPTION OF THE SEVERAL
VIEWS OF THE DRAWINGS

DETAILED DESCRIPTION

Embodiments of the present disclosure will be described in connection with managing electronic games deployed on gaming systems in a gaming venue. As will be described herein, the games are managed, at least in part, based on biometric information received from players and/or visitors in the gaming venue. This biometric information can be used to determine or rate an excitement level of the player or visitor. The excitement level ratings can then be used to better tailor the floor plan to the tastes of the players and/or visitors as well as help shape the user experience throughout their time within the venue. By tracking the players' and/or visitors' biometric information throughout a venue, a system controlling the floor layout may be able to tailor and facilitate the changing of games as well as features which could help make the experience more pleasant and engaging.

Figure 1:
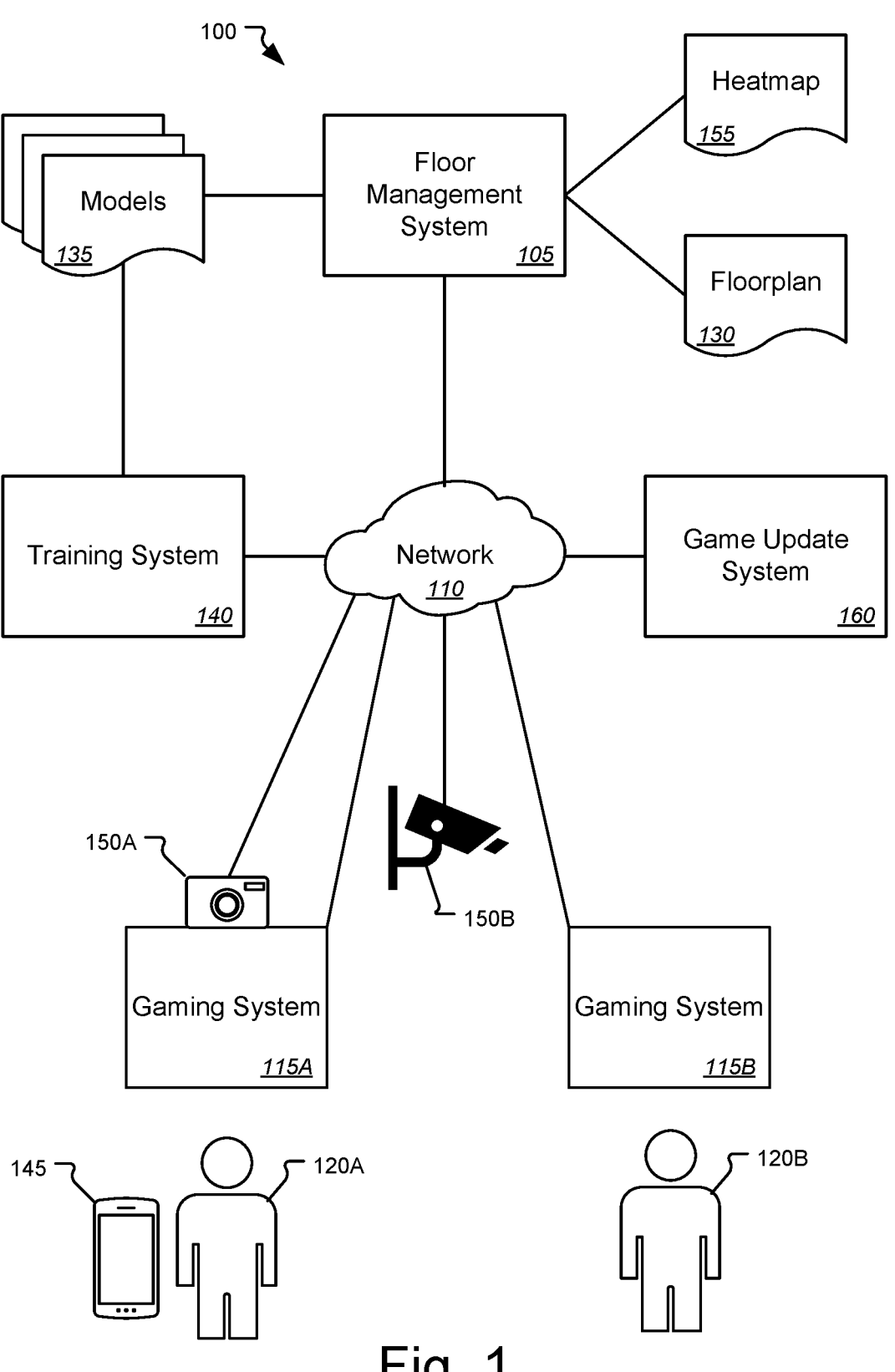
FIG. 1 is a block diagram illustrating an exemplary environment for managing a gaming venue floor layout according to embodiment of the present disclosure.

FIG. 1 is a block diagram illustrating an exemplary environment for managing a gaming venue floor layout according to embodiment of the present disclosure. As illustrated in this example, the environment 100 can include a floor management system 105 communicatively coupled with a network 110. The floor management system 105 can comprise any one or more servers and/or other computing devices as known in the art. The network 110 can comprise any one or more wired and/or wireless, wide-area and/or local-area networks as known in the art including, but not limited to, the Internet.

Also coupled with the network 110 can be any number of gaming systems 115A-115B. These gaming systems 115A-115B can include, but are not limited to, and any of a variety of known Electronic Gaming Machines (EGMs), Electronic Table Games (ETGs), and/or similar gaming systems found in casinos and other gaming venues. The gaming systems 115A-115B can execute a number of different electronic games including, but not limited to, video slots, video poker, a video table game, any of a variety of well-known casino games which are available to players 120A-120B in the gaming venue. The gaming systems 115A-115B can be located and/or arranged in the gaming venue according to a pre-defined floorplan 130.

Also coupled with the network 110 can be any number of mobile devices 130 associated with any of the players 115A such as a mobile phone, tablet, smart watch, or other device as well as other sensors such as video and/or InfraRed (IR) cameras 150A-150B. The cameras 150A-150B can be installed on or in a gaming system 115A and/or elsewhere throughout the gaming venue. Generally speaking, the floor management system 105 can collect biometric information for the players 115A-115B in the gaming venue through these sensors.

The floor management system 105 could use the biometric data to rate the various visitors of the facility's mood and emotional state to be used to help as feedback into the floor manager system 105. The floor management system 105 could create an emotional heat map 155 of the floor and a set of trained models 135 could be used to automate the adjustment of the floor on the fly or make suggestions on new floor layouts. Accordingly, the environment 100 can also include a training system 140 to apply machine learning processes to generate and train the models 135 used by the floor management system 105. It should be noted that while the floor management system 105 and training system 140 are shown here for illustrative purposes as being separate components, the functions of each may be implemented in the same or different physical and/or virtual machines. Similarly, the models 135 can be stored in and maintained by either or both of the floor management system 105 or the training system 140.

The environment 100 can further include a game update system 160 coupled with the network. Generally speaking, the game update system 160 can provide downloads of electronic games to the gaming system 115A-115B. With the use of such digital download of games on the floor, games executed by the gaming systems 115A-115B could be automatically changed to better feel the mood of the floor or be used to try to adjust the mood of the area on the floor. If an area is cool, for example, a more exciting game could be installed, and the floor management system 105 could adjust the floor to create more attractions to the newly installed game using either digital signage or audio cues, e.g., played out on the gaming systems 115A-115B or other display devices (not shown here) installed in the gaming venue, to grab use attention. Another option would be for players playing existing game, with low emotional state, to receive an offer from the floor management system 105 to install a new game to try and update the floor to give the player a more positive experience. Updates to the floor layout could be run automatically to change floor layout, or another system could send s request for changes to the floor management system 105.

The gathering of biometric information could be collected from the use of personal devices of visitors and players 115A-115B of the gaming venue by mobile devices such as smartphones, smartwatches, etc. For example, the visitors and players 115A-115B could have an app or pair with the local network to facilitate the transfer of real time biometric information to the floor management system 105. External sensors such as cameras 150A from gaming systems 115A, IR cameras 150B from the gaming venue could be used to track movement of the players 120A-120B. IR cameras 150B could be used for tracking user breathing, heart rate, etc. All sensor data could be fed into an AI model 135 per player to track player mood and state. Microphones (not shown here) in the gaming systems 115A-115B or gaming venue could be used for recording of voices and used for to track user feedback and help feedback and track player emotional state. Thus, the biometric information collected by the floor management system 105 can include, but is not limited to, facial recognition information, information collected by a smart watch connected to gaming system 115A, natural language processed for "sentiment analysis," information collected by a player tracking card, blood flow/heart rate, breath rate detected through an IR camera, player location within the gaming venue, e.g., determined and tracked through video cameras, etc.

Based on the collected biometric information and the models 135, the floor management system can identify and track players 115A-115B and visitors in the gaming venue and determine their emotional state or excitement level. For example, the models can include one or more biometric information models used for natural language processing, facial recognition, emotional state determination and rating, etc. Facial recognition or heart rate monitoring using smartwatches can be used to observe noticed frustration or disengagement based on facial recognition. Facial recognition can also be used to differentiate additional emotional states, e.g., excitement, or on detailed body cues, (e.g., eyebrow raises, smiles, nose scrunches. Detected stress signals through facial recognition or heart rate variance or electrodermal activity observed on a smart watch can also be used. Using the models 135, the floor management system 105 can generate a heatmap of excitement levels for players and/or visitors at various location in the gaming venue. The models 135 can also include one or more morels for floor layout which can be used by the floor management system 105 to update the floorplan 130 for the gaming venue based on the generated heatmap 155.

For example, the biometric information can be used by the floor management system 105 to either make hot spots of excitement or cool down hot spots depending on the targets of the operator and how the system is configured. Overall revenue can also be used as a factor on how hot and cold areas are set for targets. The overall area emotional heat map 155 can be used by the floor management system 105 to dynamically change the floor layout. If the overall emotional state is too strong or aggressive, the floor management system 105 could adjust to be more relaxing by changing or suggesting game lineup changes or control the overall lighting and other features of the surrounding game bank or games on the floor.

Changing the floorplan 130 can comprise making other changes to the games executed by the gaming systems 115A-115B or other changes to the venue including, but not limited to, bonus games, changing the music of a game or game environment, changing the presence of certain lights in the room, changing the arrangement of VLTs if people are too close together, changing the arrangement of VLTs if people are too far apart, etc.

Hot zones can be determined by the floor management system 105 using biometric information from players and analysis of intensity of gameplay among available machines, e.g., average wager played, occupancy of machines, speed of games played, etc. Realtime analysis of game titles and configurations within hot zones, enhance findings with additional data points like time of day, day of the week, special events, type of audience etc. can be used to learn about conditions that led to hot zones. Then hot zones can be replicated in other parts of the casino through dynamic download of game titles and configurations that meet the active conditions in the venue. Once a Jackpot is hit, dynamic configuration of the jackpot starting values can be applied to prolong duration of hot zones, i.e., keep a game "hot". Jackpot pots can be dynamically distributed by the floor management system 105 to fund starting values of jackpots across games based on findings from biometric information from players. Other types of dynamic configuration can include, but is not limited to, adjusting cost to cover, number of lines, available denomination options, number and heights of available jackpots, paytable RTP. etc.

According to one embodiment, the floor management system 105 can identify which games are hot for certain age & gender groups in the gaming venue, e.g., using their tracking card. By tracking the card, the floor management system 105 can "know" which players & player types are currently present in the venue and where they are playing. The floor management system 105 can then update "hot zones" according to the present player groups with games that appeal the most to these groups, within the certain hot zone they are in, in real-time. As a result, there are several different areas in the venue appealing differently attractive to different people.

According to one embodiment, the floor management system 105 can automatically "label" zones in the gaming venue based on player biometric information. For example, heart rate can be used to categorize venue areas based on thrill factor, e.g., "thrill gambling" vs. "slow roller gambling" or happiness or excitement factors for "happy gambling" vs. "serious gambling."

According to another embodiment, historical biometric information from the same or other gaming venue(s) can be used by the floor management system 105 for designing pre-defined "casino journeys". The floor management system 105 could track biometric information and the determined emotional state, e.g., excitement, happiness sadness, frustration, etc., from the venue over time compare it to scientific ideated journeys or paths through the venue and then identify a proposed best-matching path through the casino to meet this journey. For example, the player could define their desired casino journey, e.g., selected from multiple pre-defined available example, or the player could select characteristics that are important to them. Then, the floor management system 105 can show them the path to go along through the casino to gain the expected experience. The floor management system 105 could show that path on a mobile device or on a casino terminal. Similarly, such a path could be used to direct players to favorite games, back to the gaming venue if lost, etc.

According to one embodiment, the floor management system 105 can track biometric information and emotional state, e.g., happiness, excitement, sadness, frustration, etc., over time for each individual throughout their gaming venue visit. The floor management system 105 could then identify where, i.e., at which games and in which station of their casino journey, they have experienced the most excitement/happiness and there the most sadness/frustration. The floor management system 105 could then map this data from all players on a journey and identify where the "gain points" and where the "pain points" are within the venue. The floor management system 105 could use these insights for optimizing casino floor layout.

Figure 2:
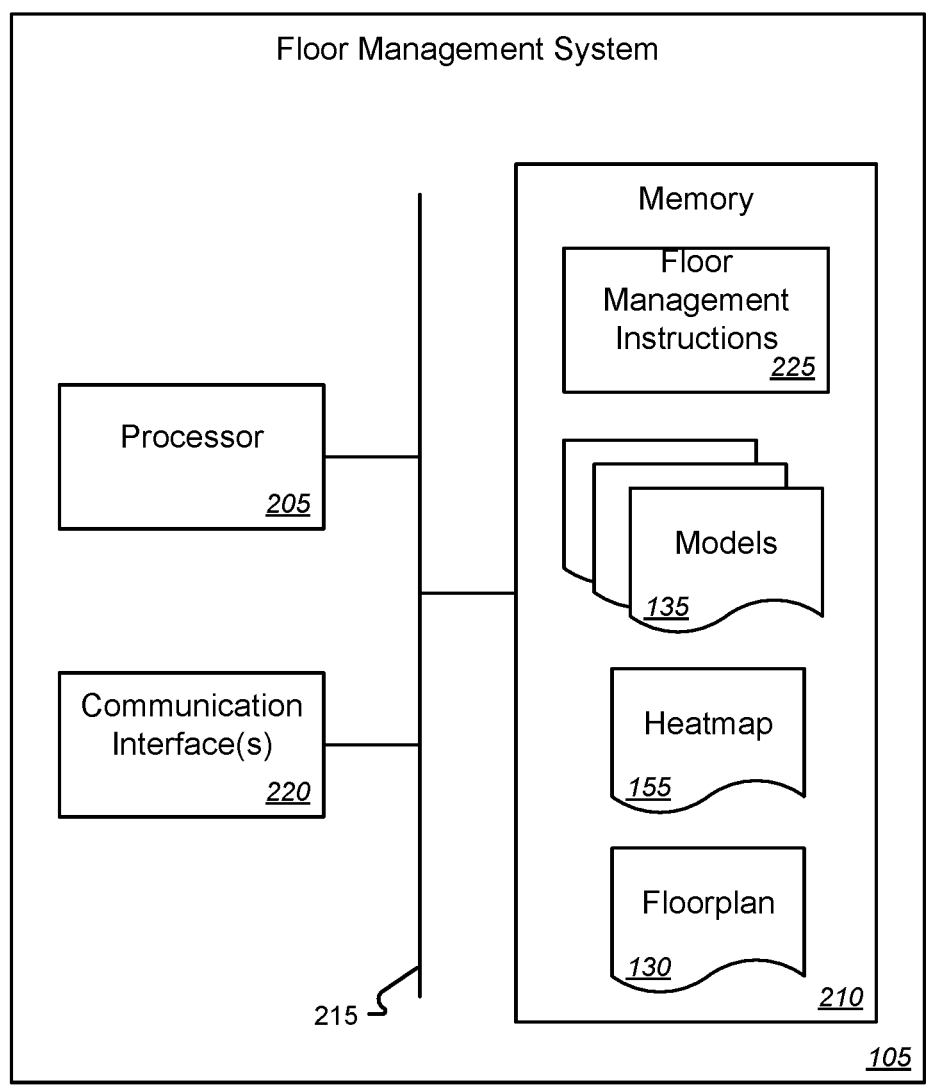
FIG. 2 is a block diagram illustrating additional details of components of a floor management system according to one embodiment of the present disclosure.

FIG. 2 is a block diagram illustrating additional details of components of a floor management system according to one embodiment of the present disclosure. As illustrated in this example, the floor management system 105 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the floor management system 105 as described herein.

The memory 210 can be coupled with and readable by the processor 205 via a communications bus 215. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with one or more communications interfaces 320. The communication interfaces 220 can comprise, for example, Ethernet, Bluetooth, WiFi, or other type of wired or wireless communications interfaces. The memory 210 can store therein a set of floor management instructions 225 which, when executed by the processor 205, causes the processor 205 to maintain and/or access a plurality of trained models 135. The plurality of trained models 135 can comprise a biometric information model and a floor layout model. As noted above, the models 135 can be stored and maintained in the memory 210 of the floor management system 105 or elsewhere accessible by the floor management system 105.

The floor management instructions 225 can further cause the processor 205 to receive biometric information from each of a plurality of sensors 145 and 150A-150B through the communication interface 220. The biometric information can be associated with each of a plurality of players 120A-120B in a gaming venue. Each player of the plurality of players 120A-120B can be using a gaming system of a plurality of gaming systems 115A-115B of the gaming venue. The plurality of gaming systems 115A-115B can be physically located in the gaming venue according to a predefined floorplan 130 for the gaming venue which can also be stored in the memory 210 of the floor management system 105 or elsewhere accessible by the floor management system 105.

The biometric information can be received from a user device 145 of a player 120A of the plurality of players 120A-120B. Additionally, or alternatively, the biometric information can be received from a video camera 150A or 150B of the gaming venue. In such cases, the biometric information can comprise, for example, facial recognition information and/or location information. The biometric information can additionally, or alternatively, be received from an InfraRed (IR) camera 150A or 150B in the gaming venue. In such cases, the biometric information can comprise a heart rate of a player 120A of the plurality of players 12A-120B and/or a respiration rate of a player 120A of the plurality of players 120A-120B.

The floor management instructions 225 can further cause the processor 205 to rate an excitement level for each player of the plurality of players 120A-120B based on the received biometric information and the biometric information model 135 and create a heatmap 155 representing the gaming venue based on the rated excitement level for and a location of each player of the plurality of players 120A-120B in the gaming venue.

The floor management instructions 225 can then cause the processor 205 to update the predefined floorplan 130 for the gaming venue based on the created heatmap 155 and the floor layout model 135. In some cases, updating the predefined floorplan 130 for the gaming venue can comprise downloading an electronic game to a gaming system 115A of the plurality of gaming systems 115A-115B. Additionally, or alternatively, updating the predefined floorplan 130 for the gaming venue can comprise providing information indicating a change to the predefined floorplan 130. Updating the predefined floorplan 130 for the gaming venue can additionally, or alternatively, comprise providing, to a player 120A of the plurality of players 120A-120B, a suggestion for a new electronic game available on a gaming system 115A of the plurality of gaming systems 115A-115B.

In some cases, the floor management instructions 225 can further cause the processor 205 to creating an attraction to a gaming system 115A of the plurality of gaming systems 115A-115B based on the updated floorplan 130 for the gaming venue. For example, the attraction can comprise a display on a display device, e.g., an image, graphic, video, etc., sent to the gaming system 115A, a player's mobile device 145, or other display through the communication interface 220. Additionally, or alternatively, the attraction can comprise an audio stream, e.g., an announcement, song, etc., sent to the gaming system 115A, a player's mobile device 145, or other device through the communication interface 220.

Figure 3:
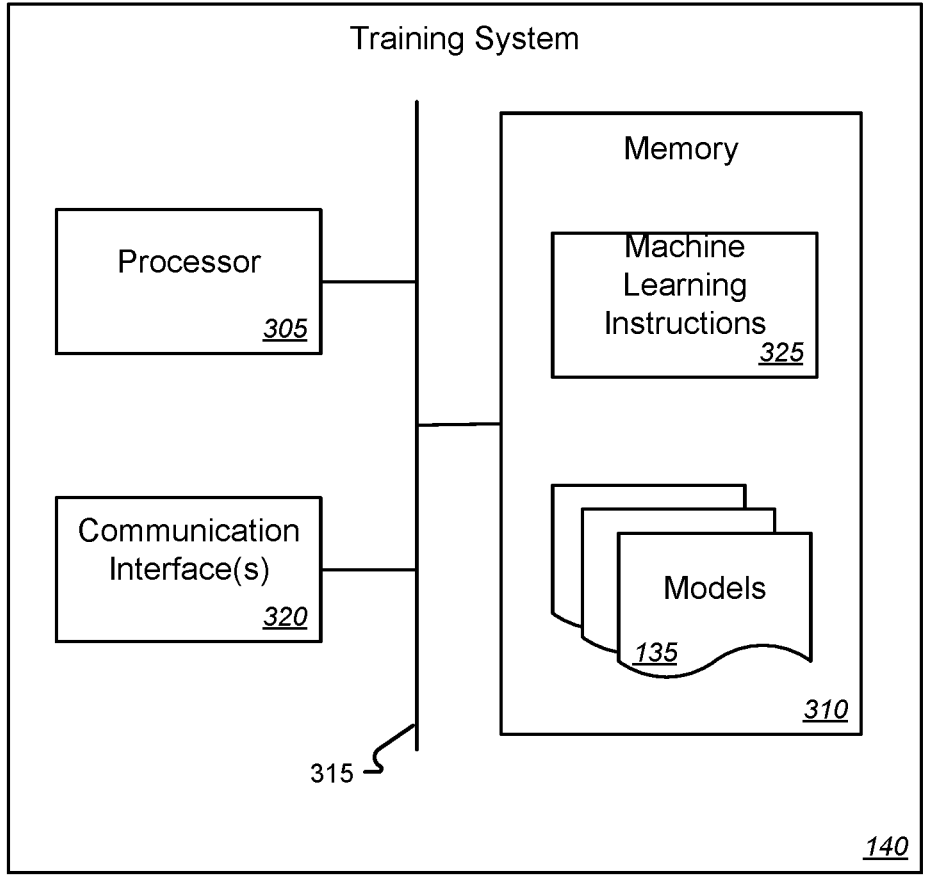
FIG. 3 is a block diagram illustrating additional details of components of a training system according to one embodiment of the present disclosure.

FIG. 3 is a block diagram illustrating additional details of components of a training system according to one embodiment of the present disclosure. As illustrated in this example, the training system 140 can comprise a processor 305 such as any of the various types of processors described above. A memory 310 can be coupled with and readable by the processor 305 via a communications bus 315. The memory 310 can comprise any one or more of the different types of volatile and/or non-volatile memories described above. The processor 305 can also be coupled with one or more communication interfaces 320 via the communications bus 315. The communication interfaces 320 can comprise, for example, Ethernet, Bluetooth, WiFi, or other type of wired or wireless communications interfaces.

The memory 310 can store therein a set of machine learning instructions 325 which, when executed by the processor 305, causes the processor 305 to generate initial models 135 for biometric information and floor layout. As noted above, the models 134 can be stored in the memory 310 of the training system 140, in the floor management system 105, or elsewhere accessible by the training system 140. Generating the initial models can be performed, for example, based on ratings of types of games available received from players, e.g., through PAR sheets with volatility, theme, etc., to quantity games. Additionally, or alternatively, a study can be conducted in which players play various configured games and record emotional state with biometric sensors. In some cases, a survey of players can be conducted and the results can be used to build the model for biometric information and mood detection.

Once the models 135 are in use, the machine learning instructions 325 can cause the processor 305 to monitor biometric information received through the communication interface 320 and floorplan updates, apply machine learning processes to the monitored information and updates, and update the models 135 by the machine learning processes. For example, the biometric information model can be trained using a deep forest training process. Additionally, or alternatively, a facial recognition classifier can be trained using a convolutional neural network or a deep learning process.

Figure 4:
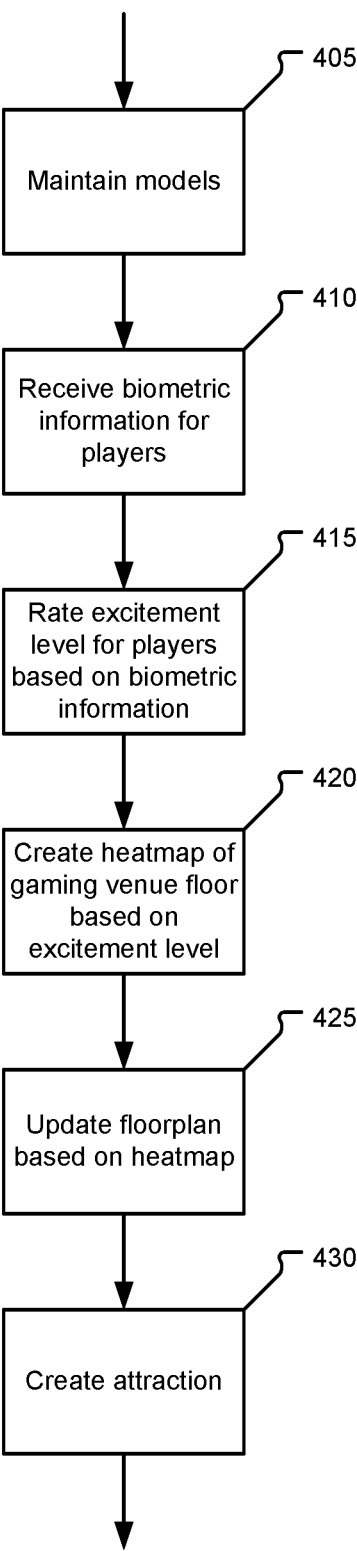
FIG. 4 is a flowchart illustrating an exemplary process for managing a gaming venue floor layout according to one embodiment of the present disclosure.

FIG. 4 is a flowchart illustrating an exemplary process for managing a gaming venue floor layout according to one embodiment of the present disclosure. As illustrated in this example, managing 405 or accessing a gaming venue floor layout can begin with maintaining a plurality of trained models 135. The plurality of trained models 135 can comprise a biometric information model and a floor layout model.

Biometric information can be received 410 from each of a plurality of sensors 145 and 150A-150B. The biometric information can be associated with each of a plurality of players 120A-120B in a gaming venue. Each player of the plurality of players 120A-120B can be using a gaming system of a plurality of gaming systems 115A-115B of the gaming venue. The plurality of gaming systems 115A-115B can be physically located in the gaming venue according to a predefined floorplan 130 for the gaming venue.

For example, the biometric information can be received from a user device 145 of a player 120A of the plurality of players 120A-120B. Additionally, or alternatively, the biometric information can be received from a video camera 150A or 150B of the gaming venue. In such cases, the biometric information can comprise, for example, facial recognition information and/or location information. The biometric information can additionally, or alternatively, be received from an InfraRed (IR) camera 150A or 150B in the gaming venue. In such cases, the biometric information can comprise a heart rate of a player 120A of the plurality of players 12A-120B and/or a respiration rate of a player 120A of the plurality of players 120A-120B.

An excitement level for each player of the plurality of players can be rated 415 based on the received biometric information and the biometric information model. A heatmap 155 representing the gaming venue can be created 420 based on the rated 415 excitement level for and a location of each player of the plurality of players 120A-120B in the gaming venue. The predefined floorplan 130 for the gaming venue can be updated 425 based on the created heatmap 155 and the floor layout model.

In some cases, updating 425 the predefined floorplan 130 for the gaming venue can comprise downloading an electronic game to a gaming system 115A of the plurality of gaming systems 115A-115B. Additionally, or alternatively, updating 425 the predefined floorplan 130 for the gaming venue can comprise providing information indicating a change to the predefined floorplan 130. Updating 425 the predefined floorplan 130 for the gaming venue can additionally, or alternatively, comprise providing, to a player 120A of the plurality of players 120A-120B, a suggestion for a new electronic game available on a gaming system 115A of the plurality of gaming systems 115A-115B.

In some cases, the method can further comprise creating 430 an attraction to a gaming system 115A of the plurality of gaming systems 115A-115B based on the updated floorplan 130 for the gaming venue. For example, the attraction can comprise a display on a display device. Additionally, or alternatively, the attraction can comprise an audio stream.

Figure 5:
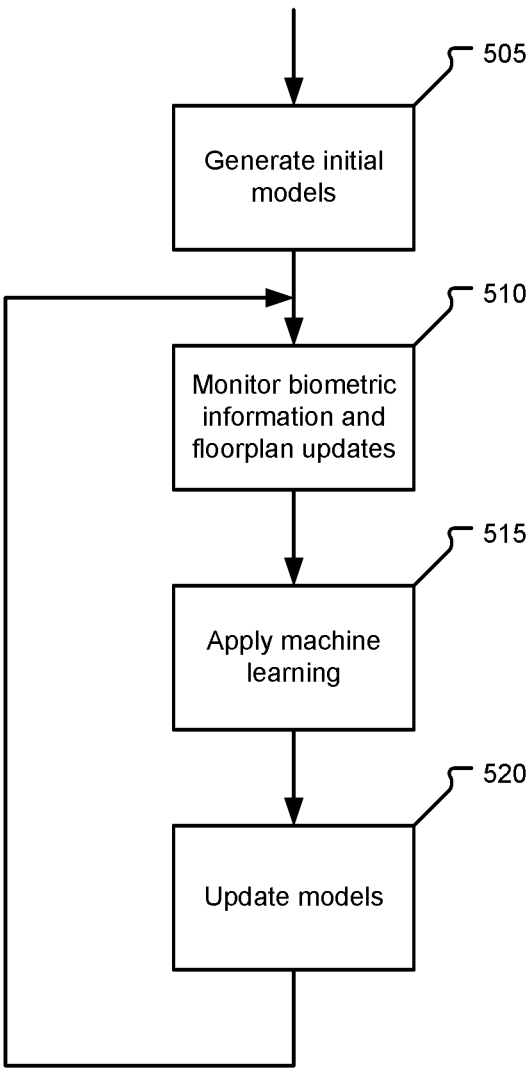
FIG. 5 is a flowchart illustrating an exemplary process for maintaining models for use in managing a gaming venue floor layout according to one embodiment of the present disclosure.

FIG. 5 is a flowchart illustrating an exemplary process for maintaining models for use in managing a gaming venue floor layout according to one embodiment of the present disclosure. As illustrated in this example, the process can begin with generating 505 initial models 135 for biometric information and floor layout. Generating 505 the initial models can be performed, for example, based on ratings of types of games available received from players, e.g., through PAR sheets with volatility, theme, etc., to quantity games. Additionally, or alternatively, a study can be conducted in which players play various configured games and record emotional state with biometric sensors. In some cases, a survey of players can be conducted and the results can be used to build the model for biometric information and mood detection.

Once the models 135 are in use, received biometric information can floorplan updates can be monitored 510, machine learning processes can be applied 515 to the monitored information and updates, and the models 135 can be updated 520 by the machine learning processes. For example, the biometric information model can be trained using a deep forest training process. Additionally, or alternatively, a facial recognition classifier can be trained using a convolutional neural network or a deep learning process.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for managing a gaming venue floor layout, the method comprising:
    maintaining, by a processor of a floor management system, a plurality of trained models, the plurality of trained models comprising a biometric information model and a floor layout model;
    receiving, by the processor of the floor management system, biometric information from each of a plurality of sensors, the biometric information associated with each of a plurality of players in a gaming venue, each player of the plurality of players using a gaming system of a plurality of gaming systems of the gaming venue, wherein the plurality of gaming systems are physically located in the gaming venue according to a predefined floorplan for the gaming venue, and wherein the predefined floorplan defines a location within the gaming venue for each gaming system of the plurality of gaming systems;
    rating, by the processor of the floor management system, an excitement level for each player of the plurality of players based on the received biometric information and the biometric information model;
    creating, by the processor of the floor management system, a heatmap representing the gaming venue and the excitement level of each player of the plurality of players throughout the gaming venue based on the rated excitement level for and a location of each player of the plurality of players in the gaming venue; and automatically updating, by the processor of the floor management system, the predefined floorplan for the gaming venue based on the created heatmap and the floor layout model.

2. The method of claim 1, wherein updating the predefined floorplan for the gaming venue comprises downloading an electronic game to a gaming system of the plurality of gaming systems.

3. The method of claim 1, wherein updating the predefined floorplan for the gaming venue comprises providing information indicating a change to the predefined floorplan.

4. The method of claim 3, wherein updating the predefined floorplan for the gaming venue comprises providing, to a player of the plurality of players, a suggestion for a new electronic game available on a gaming system of the plurality of gaming systems.

5. The method of claim 1, further comprising creating, by the processor of the floor management system, an attraction to a gaming system of the plurality of gaming systems based on the updated floorplan for the gaming venue.

6. The method of claim 5, wherein the attraction comprises a display on a display device.

7. The method of claim 5, wherein the attraction comprises an audio stream.

8. A floor manager system comprising:
    a processor; and
    a memory coupled with and readable by the processor and storing therein a set of instructions which, when executed by the processor, causes the processor to:
        maintain a plurality of trained models, the plurality of trained models comprising a biometric information model and a floor layout model;
        receive biometric information from each of a plurality of sensors, the biometric information associated with each of a plurality of players in a gaming venue, each player of the plurality of players using a gaming system of a plurality of gaming systems of the gaming venue, wherein the plurality of gaming systems are physically located in the gaming venue according to a predefined floorplan for the gaming venue, and wherein the predefined floorplan defines a location within the gaming venue for each gaming system of the plurality of gaming systems;
        rate an excitement level for each player of the plurality of players based on the received biometric information and the biometric information model;
        create a heatmap representing the gaming venue and the excitement level of each player of the plurality of players throughout the gaming venue based on the rated excitement level for and a location of each player of the plurality of players in the gaming venue; and
        automatically update the predefined floorplan for the gaming venue based on the created heatmap and the floor layout model.

9. The floor manager system of claim 8, wherein the biometric information is received from a user device of a player of the plurality of players.

10. The floor manager system of claim 8, wherein the biometric information is received from a video camera of the gaming venue.

11. The floor manager system of claim 10, wherein the biometric information comprises facial recognition information.

12. The floor manager system of claim 10, wherein the biometric information comprises location information.

13. The floor manager system of claim 8, wherein the biometric information is received from an InfraRed (IR) camera in the gaming venue.

14. The floor manager system of claim 13, wherein the biometric information comprises a heart rate of a player of the plurality of players.

15. The floor manager system of claim 13, wherein the biometric information comprises a respiration rate of a player of the plurality of players.

16. A non-transitory, computer-readable medium comprising a set of instructions stored therein which, when executed by a processor, causes the processor to:

maintain a plurality of trained models, the plurality of trained models comprising a biometric information model and a floor layout model;

receive biometric information from each of a plurality of sensors, the biometric information associated with each of a plurality of players in a gaming venue, each player of the plurality of players using a gaming system of a plurality of gaming systems of the gaming venue, wherein the plurality of gaming systems are physically located in the gaming venue according to a predefined floorplan for the gaming venue, and wherein the predefined floorplan defines a location within the gaming venue for each gaming system of the plurality of gaming systems;

rate an excitement level for each player of the plurality of players based on the received biometric information and the biometric information model;

create a heatmap representing the gaming venue and the excitement level of each player of the plurality of players throughout the gaming venue based on the rated excitement level for and a location of each player of the plurality of players in the gaming venue; and automatically update the predefined floorplan for the gaming venue based on the created heatmap and the floor layout model.

17. The non-transitory, computer-readable medium of claim 16, wherein the instructions further cause the processor to train the biometric information model based on the received biometric information.

18. The non-transitory, computer-readable medium of claim 17, wherein the instructions further cause the processor to train the biometric information model comprised using deep forest training process.

19. The non-transitory, computer-readable medium of claim 16, wherein the instructions further cause the processor to train a facial recognition classifier using a convolutional neural network.

20. The non-transitory, computer-readable medium of claim 16, wherein the instructions further cause the processor to train a facial recognition classifier using a deep learning process.

\*　\*　\*　\*　\*